April 6, 1954        P. DE FILLIPS        2,674,667
DIRECTION SIGNALING MECHANISM FOR AUTOMOTIVE VEHICLES
OPERABLE BOTH MANUALLY AND AUTOMATICALLY
Filed Oct. 6, 1950                               2 Sheets-Sheet 2
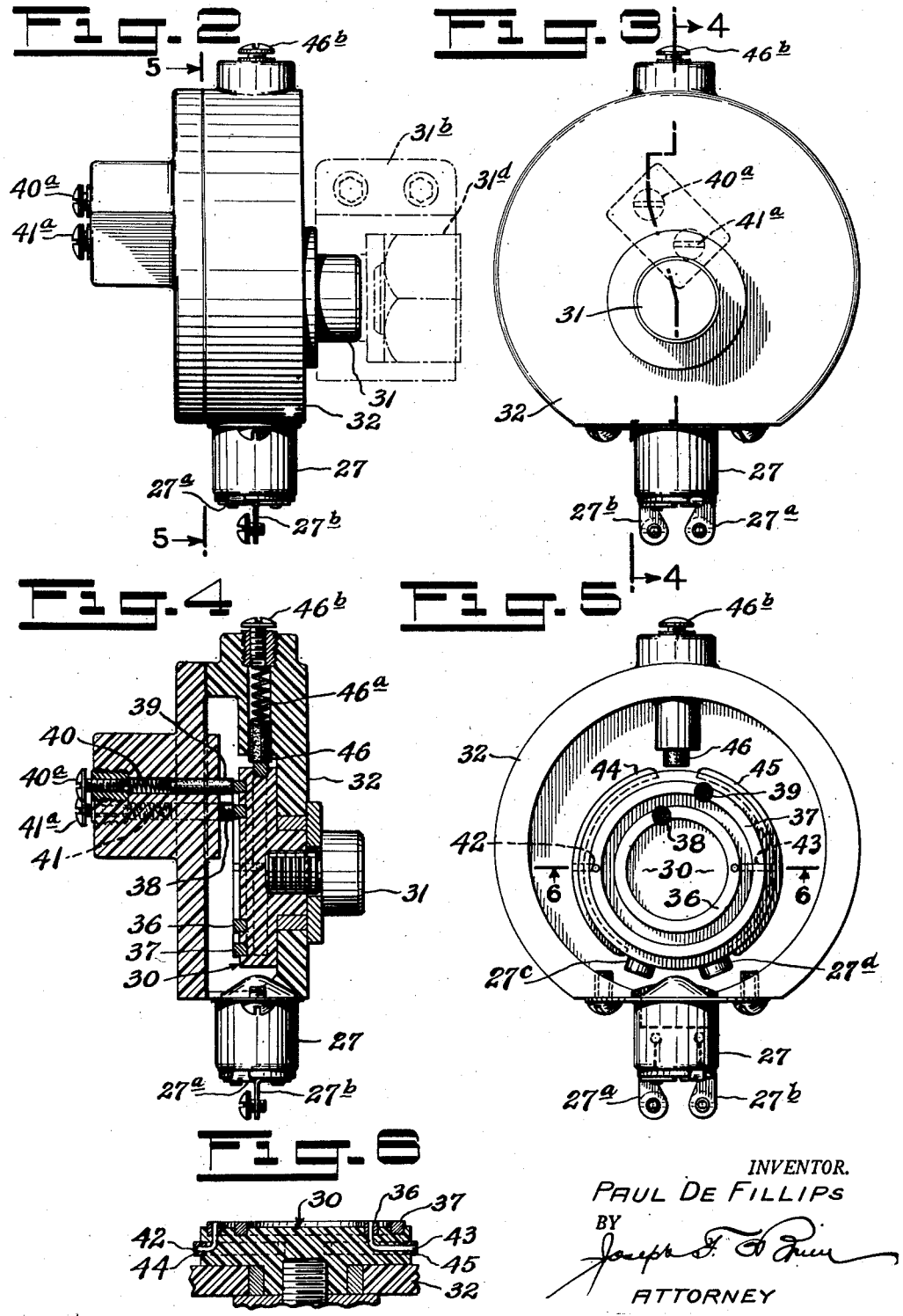
INVENTOR.
PAUL DE FILLIPS
BY
ATTORNEY Patented Apr. 6, 1954

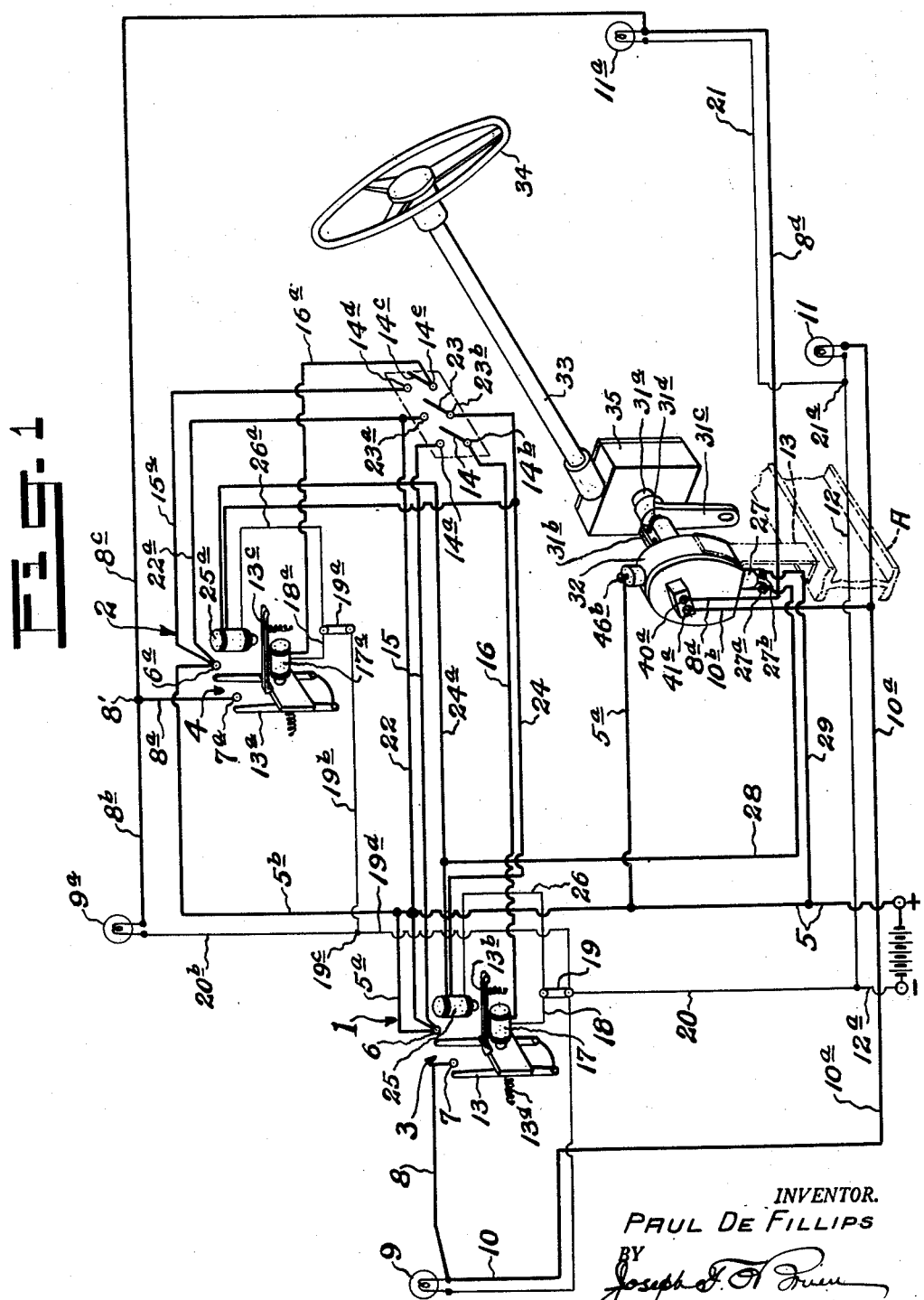

2,674,667

UNITED STATES PATENT OFFICE 2,674,667

DIRECTION SIGNALING MECHANISM FOR AUTOMOTIVE VEHICLES OPERABLE BOTH MANUALLY AND AUTOMATICALLY

Paul De Fillips, Fairview, N. J.; Gerard De Phillips, executor of said Paul De Fillips, deceased Application October 6, 1950, Serial No. 188,722

2 Claims. (Cl. 200—61.33)

This invention relates to direction signalling mechanism for automotive vehicles operable both manually and automatically.

It is desirable for a driver, during a considerable interval of time before or in advance of the actual turning of the vehicle, to signal the direction in which he is about to turn, and for this purpose it is necessary to provide a manually-actuated mechanism for advance signalling. It happens at times that an operator or driver will forget to give an advance signal of the direction that the vehicle is about to turn and it is therefore desirable to provide a dual-actuated mechanism which, though initially operable by the driver to give an advance signal, will also, immediately upon the beginning of a turning movement, automatically and by the mere normal movement of the mechanism used in the operation of a vehicle cause a final directional signal to be given.

By my invention, such advance and final signalling devices are embodied in a single integrated combination mechanism adapted both for advance signalling through manual operation by the driver and for final signalling through automatic actuation by the normal movement of elements used in the operation of the vehicle, such signalling preferably being accomplished by the lighting of signalling lamps at the front and rear of a vehicle to indicate the direction in which the vehicle is about to turn. Thus, when the vehicle is about to be or is being turned to one side of the road, my signalling mechanism will cause lighting of signal lights at front and rear of the vehicle on that side of the road, and when the vehicle is about to be or is being turned in the opposite direction, said mechanism will cause the lighting of another set of signalling lamps at the opposite side of the road.

One of the objects of this invention is to produce a combined signalling mechanism of the character specified which embodies a pair of primary circuits including manually-operable and preferably normally open switch devices capable of manual operation alternately by the operator to actuate signal devices which provide an advance signal before any turning movement of the vehicle, and additional integrated circuits and mechanisms or devices adapted upon the beginning of a turning movement of the vehicle to automatically release or disconnect any advance manually-operable circuit that may be in operation and simultaneously to substitute therefor a final automatically-actuated circuit which will take over and continue actuation of any signals then being used until the completion of the turning movement of the vehicle, and furthermore, immediately upon the straightening out of the steering mechanism of the vehicle, will cause the automatic disconnection and release from further operation of all signals.

Another object of this invention is, in a device of the type specified, to provide an automatically-actuated signalling mechanism which comprises an attachment including a stationary housing adapted for ready and easy mounting on a stationary part of an automobile, such as the axle or chassis, and having mounted therein a movable or operative disc provided with a mechanical connection to the stub shaft of the steering mechanism adjacent to the conventional connecting link arm between such steering mechanism and the transverse steering rod in order to oscillate the same, said disc having mounted thereon electrical switch mechanism adapted to release or disconnect any manually-operable circuit for advance signalling that may be in operation and simultaneously to substitute therefor final normally-open and alternately-operable circuits which are alternately and automatically closed during a turning in one direction or the other of the vehicle and which will take over and continue actuation of any signals then in operation until the completion of such turning movement, and upon the straightening out of the steering mechanism of the vehicle will cause opening of said final automatically-actuated circuits with a consequent automatic disconnection and release from further operation of all signals.

Another object of this invention is to connect with each of said lamp circuits pairs of mechanisms including manually-actuated switches, preferably comprising push-button switches, and magnets operated thereby for alternately operating one of said lamp circuits manually by the driver to provide for advance lighting of the signalling lamps as aforesaid.

Another object of this invention is in a direction signalling mechanism of the type specified to provide a switch construction embodying a switch-disc of insulating material mounted to be oscillated automatically within a stationary housing by normal movement of the steering mechanism and provided on its peripheral surface with a pair of spaced switch terminals alternately engageable with a stationary or fixed contact preferably comprising a spring-pressed finger contact, said switch terminals comprising segmental track-contact members on which said stationary or fixed contact is adapted to ride alternately, the members of said pair of segmental contact members being connected in and forming terminal contacts of a pair of alternately-operable open circuits adapted upon closing alternately to light pairs of lamps at front and rear of one side or the other of the vehicle. Said segmental track-contacts are thus adapted, upon oscillation of the disc in one direction, to engage and provide a sliding contact and connection with said fixed contact and thus to close one of said open circuits to light one pair of lamps on one side, as for example the right side of the vehicle, and upon oscillation of the disc in the opposite direction to light the other pair at the opposite or left side of the vehicle. The members of said spaced pair of segmental contact are preferably arranged on opposite sides of said stationary or fixed spring-pressed finger contact which is connected with a common circuit wire leading to the positive side of the primary lamp circuits and being adapted to be alternately engaged upon oscillation as aforesaid of the disc in opposite directions, and in accordance with the direction of turning of said disc by the steering mechanism to close and energize one of said open circuits to light a lamp and preferably a pair of lamps located at that side of the vehicle toward which it is turning.

Another object of this invention is in an automatically-actuated switch device comprising an oscillative disc of insulating material to combine on said disc a pair of alternately-connectable terminal contacts located on its peripheral surface and composed of a pair of segmental track contact members spaced from each other for alternate connection upon oscillation of the disc with an intermediately-positioned stationary spring-pressed finger contact and a pair of intra-circuit or continuously-connected track contacts positioned on the side surface of said disc in parallel relationship to each other and continuously-engaged with a pair of spring-pressed contact fingers to bring to said disc and terminal contacts a pair of open circuits which are closable alternately to enable alternate lighting of pairs of lamps at opposite sides of the vehicle in accordance with the direction of the turning of the disc by the steering mechanism.

Still another object of this invention is in a signalling mechanism to utilize, in combination with a manually-actuated circuit provided with magnetically-actuated switch-closing elements, an automatically-actuated switch comprising an oscillative disc having on a part of its periphery a pair of spaced segmental track contacts operable automatically on oscillation of the disc to close alternately and to retain in closed condition during the turning movement of the disc and vehicle a pair of substitute lamp-lighting circuits, and also to provide on another part of said periphery a pair of spaced point contacts adapted to be engaged simultaneously with engagement of said track contacts upon oscillation of the disc, said spaced contacts being connected in circuits operable alternately and including release elements adapted to release the magnetically-actuated switch-closing elements or contact-producing devices in manually-actuated circuits, said point contacts preferably comprising a pair of projecting spaced teats disposed on the periphery of the disc and combined with a normally-open push-button switch adapted upon actuation to cause operation of both members of a pair of releasing circuits adapted to cause complete disconnection of the magnetically-actuated switch closing elements in both of said manually-actuated circuits simultaneously with the automatically-actuated connection of either one of said alternately operable and normally open lamp circuits.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a diagrammatic view of alternately-operable primary lamp-circuits actuatable manually to give advance right or left signals and operable automatically upon turning to release any manually-operated advance signals, to substitute during turning an automatic signalling which will be automatically released by the straightening up of the steering mechanism;

Fig. 2 is a view in side elevation of a switch mechanism adapted to be mechanically connected to the stub shaft of the steering mechanism and to be mounted on the front axle or other stationary part of the vehicle;

Fig. 3 is a view of one side face of the device illustrated in Fig. 2;

Fig. 4 is a section on the line 4—4 of Fig. 3 looking in the direction of the arrows;

Fig. 5 is a section on the line 5—5 of Fig. 2 looking in the direction of the arrows; and Fig. 6 is a section on the line 6—6 of Fig. 5 looking in the direction of the arrows.

In accordance with the preferred form of my invention, I provide a combined signalling mechanism of the character specified which embodies a pair of primary lamp-lighting circuits 1 and 2 including normally-open switch devices 3 and 4 normally open and capable of manual operation alternately by the operator to actuate signal devices such as the lamps 9, 9ª and 11, 11ª and thus to provide an advance signal before any turning movement of the vehicle, and in accordance with my invention I provide two additional integrated circuits hereinafter specified embodying mechanisms including switches adapted upon the beginning of a turning movement of the vehicle (1) to automatically release or disconnect any advance manually-operable circuit that may be in operation, and (2) simultaneously to substitute therefor a final automatically-actuated circuit which will take over and continue actuation of any signals then being used until the completion of the turning movement of the vehicle, and furthermore said substitute circuit is adapted, immediately upon the straightening out of the steering mechanism of the vehicle, to be automatically disconnected and operation of all signals will be discontinued.

My preferred normally-open primary circuit 1 and the switch mechanism for manually-closing and opening the same comprise a left-turning circuit composed of primary circuit wire 5 having a connection with the positive end of the battery and extending to and through wire 5ª to terminal member 6 of a pair of normally-open switch terminals 6 and 7, thence from the terminal 7 by wire 8 to the front member 9 of a pair of left-hand signal lamps which is positioned at the front of the vehicle, thence by wire 10—10ª to the rear member 11 of the left-turning signalling lamp positioned at the rear of the vehicle, and thence across said lamp 11 by negative wires 12—12ª to the negative side of the battery. A magnet-movable switch member 13 normally held in open position by spring 13ᵈ is adapted upon movement to connect the contacts 6 and 7 to close said open circuit to said signal lamps 9 and 11, and in the preferred embodiment of my invention the magnet-movable switch member 13 is adapted to be moved to closed position by a manually-actuated switch 14, preferably of the push-button type. As illustrated, the contact 6 is connected by wire 15 to one of the terminals 14ª of said switch 14 and the opposite terminal 14ᵇ is connected by wire 16 to the positive side of a switch-operable magnet 17, the negative side of which is connected by wires 18, bridge 19 and wires 20 and 12ª to the negative side of the battery. Upon manual operation of the switch 14 the magnet will thus connect the contacts 6 and 7 to normally close the primary circuit to the lamps 9 and 11, being held in such closed position by the spring-retained hook 13ᵇ, and current will then normally flow through the above-mentioned primary circuit to said lamps to light the same and provide an advance manually-actuated signal at the front and rear of the left-hand side of the vehicle.

The manually-actuated and alternately-operable right-turning circuit 2 comprises wire 5 which has a connection at one end to the positive side of the battery, thence through wire 5ᵇ to one member 6ª of a pair of normally open switch terminals 6ª, 7ª, said normally open right-circuit then extending from the contact 7ª through connection 8′, wires 8ª, 8ᵇ to right turning signal lamp 9ª at the front of the vehicle, current passing through said lamp 9ª and thence by negative wire 20ᵇ to and through the bridge 19 and wires 20 and 12ª to the negative side of the battery. The lamp circuit for the right-turn lamp at the rear extends from connection 8′ in the opposite direction through wire 8ᶜ to the lamp 11ª, thence by negative wire 21 to connection 21ª to and through wires 12 and 12ª to the negative side of the battery. Connected with one of the normally open terminals 6ª of the right turning circuit by a wire 15ª is a manually operable switch mechanism 14ᶜ including terminals 14ᵈ—14ᵉ.

The switch 14ᶜ is adapted to be manually closed and when closed, a circuit will be formed from the terminal 14ᵉ through the wire 16ª to the positive side of a magnet 17ª and thence from the negative side thereof through wire 18ª, bridge 19ª, wire 19ᵇ, connection 19ᶜ, wire 19ᵈ to the bridge 19, and thence by wires 20 and 12 to the negative side of the battery.

Upon closing of the circuit terminals 6ª—7ª by the manually-actuated switch 13ª, current will thereupon flow to the signalling lamps 9ª and 11ª which will enable the giving of an advance signal that a right turn by the vehicle is about to be made.

In the preferred embodiment of my invention I provide a magnet-operable switch release circuit which is preferably manually operable to release the magnet-closed switches 13 and 13ª from contact respectively with the terminals 6 and 7 and 6ª and 7ª, but this circuit is particularly automatically-operable as hereinafter specified. With these ends in view, I connect to each of the terminals 6 and 6ª by wires 22—22ª a terminal 23ª of a manually-actuated switch member 23, the opposite terminal 23ᵇ of which is connected by wires 24, 24ª to a pair of releasing magnets 25, 25ª, which upon the manual closing of the contacts 23ª, 23ᵇ by the switch 23 will energize the magnets to release the retaining hooks 13ᵇ, 13ᶜ to open switches 13—13ª, thus reopening the primary lamp circuits and cutting out energy to all the signalling lamps, it being understood that the circuit from the release magnets 25 will pass through the negative wire 26 to and through the bridge 19, thence through wires 20 and 12ª to the negative side of the battery, while the circuit from the release magnet 25ª will pass through the negative circuit wire 26ª to bridge 19ª, wire 19ᵇ, connection 19ᶜ, wire 19ᵈ, bridge 19, wires 20 and 12ª to the negative side of the battery.

In accordance with the preferred form of my invention, I provide automatically-actuated means for alternately releasing the switches 13, 13ª by the automatic operation of a push-button switch 27 which is automatically actuated by movement of the steering mechanism of the vehicle. One terminal of this switch 27 is connected to the circuit for operating the release magnets 25—25ª to enable automatic release of the switches 13—13ª by operation of my preferred form of automatically-actuated switch device. A terminal contact 27ª of switch 27 is thus connected by wire 28 to wire 24ª in the circuits of the release magnets. This wire 24ª extends in opposite directions to both release magnets 25—25ª, while the opposite terminal contact 27ᵇ of the switch 27 is connected by wire 29 with the wire 5 which extends to the positive side of the battery, the negative side of these automatic release circuits extending through the release magnets and to the negative side of the battery as hereinabove specified. As shown, said automatically-actuated release circuit will extend from the battery through the wires 5 and 29 across the terminals of the switch 27 to the wire 28, to the release circuit wire 24ª and thence in opposite directions through the release magnets 25—25ª and the negative wires hereinabove referred to and to the negative side of the battery.

My preferred automatically-actuated substitute circuit which, as aforesaid, is substituted for the advance manually-actuated means for operating said primary circuit embodies a novel automatic switch mechanism which comprises an attachment adapted for mechanical connection with the steering mechanism and comprises a flat disc 30 of insulating material having projecting at one side thereof a stub shaft 31 mounted for rotative movement of said disc in a housing 32 mounted in stationary position preferably by bracket 13 extending to the vehicle frame A and adapted to be fixedly connected with the stub shaft of the steering-mechanism for oscillating movement to the right or left of the vehicle in accordance with the movement of said steering-mechanism stub-shaft 31 which is moved by the steering column 33 and steering wheel 34 of such vehicle through gear mechanism (not shown) in gear box 35 and is connected by the link member 31ᵇ to the wheel turning mechanism. Said disc is provided at one side surface thereof with a pair of circular track contact members comprising rings 36 and 37 for left and right turning respectively, each of which is connected with independent and continuously-engaged finger-contact members 38 and 39 which are suitably retained in contact therewith preferably by springs 40 and 41 which extend to screw contact members 40ª, 41ª positioned on the outside of the housing 32. The contact members 38 and 39 continuously connect such side-surface circular track members 36 and 37 by wires 42 and 43 with alternately-connectable and automatically-actuated segmental switch contact members 44 and 45 and these members 44 and 45 are each connected through said finger contacts 38 and 39 with one side of each of the primary lamp circuits 1 and 2.

Said automatically-actuated switch members 44 and 45 comprise a pair of peripherally mounted track contacts spaced from each other and normally disengaged, but alternately engageable upon oscillation of said disc with a single stationary spring-pressed contact finger 46 connected with the opposite side of said primary lamp circuits and adapted to light lamps on either side of the vehicle at front and rear thereof in accordance with the oscillating movement of said disc, a slight peripheral movement only of the disc being necessary to cause one of said arcuate track contacts 44 and 45 to be engaged and connected with said stationary spring-pressed contact finger 46. The contact between said contact finger 46 and one of said contacts 44 and 45 will switch in one or the other of said continuously connected or engaged track contact rings 36 and 37 for the purpose of lighting said lamps at one or the other side of the vehicle.

As illustrated, the contact finger 46 is connected through spring 46$^a$ with screw-contact 46$^b$ located on the periphery of the outer casing 32 and this screw-contact 46$^b$ is connected by wire 5$^a$ to wire 5 which, as aforesaid, leads to the positive side of the battery, while the screw contact 40$^a$ is connected by wire 8$^d$ to provide automatic control of the lamp circuit for the lamps at one side of the vehicle and the screw-contact 41$^a$ is connected by wire 10$^b$ to wire 10$^a$ to provide automatic control for the lamps at the opposite side of the vehicle.

Thus, in accordance with the preferred embodiment of my invention, I connect in each of the primary lamp circuits a final automatically-actuated circuit and also provide on my insulating oscillatory disc hereinabove referred to means for automatically actuating the release switch 27 which comprises a pair of teat contacts 27$^c$, 27$^d$ adapted alternately to engage the push-button switch 27 which is operable to operate the release magnets 25, 25$^a$ for the purpose of disconnecting the switches 13 and 13$^a$ in such primary lamp circuits. Said pair of teat contact members 27$^c$ and 27$^d$ are thus arranged to cooperate with the simultaneously actuated substituted circuit to release switches which control the manually-actuated switch mechanism which give advance signalling and to permit complete substitution of the automatically actuated switches. This teat-operation of the switches will occur, as aforesaid, simultaneously with the connection of the arcuate switches hereinabove referred to upon the oscillation in either direction of said automatic switch embodying disc of insulated material.

Said signalling mechanism thus preferably embodies a simple attachment including the stationary housing 32 adapted for ready and easy mounting on a stationary part of an automobile, such as the chassis, and having mounted therein a movable or operative disc provided with a mechanical connection to the stub shaft of the steering mechanism adjacent to the conventional connecting link arm between such steering mechanism and the transverse steering rod.

In the embodiment of my invention illustrated, the stub shaft 31 is connected by any suitable means such as the clamp 31$^b$ to the end of the steering shaft 31$^a$ which terminates after passing through the link 31$^c$ and is provided with a screw thread having a nut 31$^d$ (see Fig. 2) mounted theron, which nut is preferably engaged in a suitable opening therefor in the clamp 31$^b$.

Having described my invention, I claim:

1. A controlling switch for automobile signalling systems including an insulating casing, a shaft journalled in said casing and adapted for connection to the steering mechanism of the automobile, an insulating disk carried by said shaft, a pair of segmental contacts extending around said disk and having spaced adjacent ends, a contact projecting radially from the casing and normally extending between said ends and having means for connecting a circuit wire, a pair of concentric contact rings mounted on said disk each having conductive connection to a respective segmental contact, and a pair of spring-pressed contacts extending into said casing and engaging respective rings and each provided with a circuit wire connection terminal.

2. A controlling switch for automobile signalling systems including an insulating casing, a shaft journalled in said casing and adapted for connection to the steering mechanism of the automobile, an insulating disk carried by said shaft, a pair of segmental contacts extending around said disk and having spaced adjacent ends, a contact projecting radially from the casing and normally extending between said end having means for connecting a circuit wire, a pair of concentric contact rings mounted on said disk each having conductive connection to a respective segmental contact, a normally open circuit closer projecting radially from said casing and provided with means for circuit connections, said circuit closer having a push button extending into the casing, and button camming lugs extending from said disk in spaced relation to normally lie on opposite sides of said push button.

References Cited in the file of this patent

UNITED STATES PATENTS

| Number | Name | Date |
|---|---|---|
| 1,763,465 | Hild | June 10, 1930 |
| 1,779,799 | Blum | Oct. 28, 1930 |
| 1,973,299 | Swartwout | Sept. 11, 1934 |
| 2,108,454 | Steinman | Feb. 15, 1938 |
| 2,268,545 | Crider | Jan. 6, 1942 |